United States Patent
Yang et al.

(10) Patent No.: US 10,964,990 B2
(45) Date of Patent: *Mar. 30, 2021

(54) BATTERY PACK AND ELECTRICAL COMBINATION

(71) Applicant: Chervon (HK) Limited, Wanchai (HK)

(72) Inventors: Dezhong Yang, Nanjing (CN); Jifeng Feng, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,908

(22) Filed: Sep. 6, 2019

(65) Prior Publication Data
US 2019/0393475 A1    Dec. 26, 2019

Related U.S. Application Data

(63) Continuation of application No. 15/221,715, filed on Jul. 28, 2016, now Pat. No. 10,476,067.

(30) Foreign Application Priority Data

Aug. 4, 2015 (CN) .......................... 201510471534.7

(51) Int. Cl.
*H01M 2/34* (2006.01)
*H01M 2/10* (2006.01)
*B25F 5/02* (2006.01)
*H01M 50/572* (2021.01)
*B25F 5/00* (2006.01)
*H01M 50/20* (2021.01)

(52) U.S. Cl.
CPC .............. *H01M 50/572* (2021.01); *B25F 5/00* (2013.01); *B25F 5/02* (2013.01); *H01M 50/20* (2021.01); *H01M 2200/00* (2013.01); *H01M 2220/30* (2013.01)

(58) Field of Classification Search
None
See application file for complete search history.

(56) References Cited

U.S. PATENT DOCUMENTS

2005/0194929 A1 * 9/2005 Funabashi ............. H02J 7/0031
                                                                  320/114
2006/0091858 A1    5/2006 Johnson et al.
(Continued)

FOREIGN PATENT DOCUMENTS

CN    102222827 A    10/2011
CN    102761114 A    10/2012
(Continued)

*Primary Examiner* — Christopher P Domone
(74) *Attorney, Agent, or Firm* — Greenberg Traurig, LLP (57) ABSTRACT

An electrical combination includes a battery pack and a power tool. The battery pack includes two battery pack connectors which are connected with the same electrode of a battery of the battery pack. A circuit of one battery pack connector has a resistance greater than that in another circuit of another battery pack connector. The power tool includes corresponding tool connectors. When the battery pack is connected with the power tool, the power tool is supplied with a small current by the battery pack firstly, and then is supplied with a large current, so the electric spark is eliminated when the terminals of the battery pack contact with the terminals of the power tool.

6 Claims, 5 Drawing Sheets

(56) References Cited

U.S. PATENT DOCUMENTS

| | | | |
|---|---|---|---|
| 2009/0096419 A1* | 4/2009 | White | H02J 7/0026 320/118 |
| 2011/0069422 A1* | 3/2011 | Yamamoto | H01M 10/44 361/93.9 |
| 2011/0250780 A1 | 10/2011 | Fukumoto et al. | |
| 2012/0274245 A1 | 11/2012 | Takano et al. | |

FOREIGN PATENT DOCUMENTS

| | | |
|---|---|---|
| EP | 2713474 A2 | 4/2014 |
| EP | 3059781 A1 | 8/2016 |

* cited by examiner

BATTERY PACK AND ELECTRICAL COMBINATION

CROSS REFERENCE TO RELATED APPLICATION

This application is a continuation of U.S. patent application Ser. No. 15/221,715 filed on Jul. 28, 2016. This application also claims the benefit of CN 201510471534.7, filed on Aug. 4, 2015, each of which are incorporated herein by reference in their entirety.

FIELD OF THE DISCLOSURE

The present disclosure relates generally to battery packs and electrical combinations.

BACKGROUND OF RELATED ART

A motor control system of power tools generally includes a large capacity capacitor. When a battery pack is connected with the power tool, the voltage at the capacitor is low, the battery pack charges the capacitor, and a large current is generated at the moment of charging. So electric spark may be generated at the connection pieces, which may corrode the connection pieces.

The statements in this section merely provide background information related to the present disclosure and may not constitute prior art.

SUMMARY

In one example of the disclosure, an electrical combination is provided. The electrical combination includes a power tool which has a power device is configured to use electric energy to realize a power tool function; a capacitor is connected with the power device; a first tool connector is connected with a terminal of the capacitor; a second tool connector is connected with the terminal of the capacitor; and a third tool connector is connected with another terminal of the capacitor. The electrical combination also includes a battery pack has a battery includes a positive electrode and a negative electrode; a first battery pack connector for connecting with the first tool connector; a second battery pack connector for connecting with the second tool connector after the first battery pack connector connecting with the first tool connector; and a resistor is connected between the battery and the first battery pack connector, the resistor arranged so that the resistance between the first battery pack connector and the battery is greater than the resistance between the second battery pack connector and the battery, and thus limit the current flowing into or from the battery through the first battery pack connector. The first battery pack connector and the second battery pack connector are connected with one of the positive electrode or the negative electrode of the battery.

In another example of the disclosure, a battery pack configured to a power tool with a tool connector is provided. The battery pack includes a battery comprising a positive electrode and a negative electrode; a first battery pack connector for connecting with the first tool connector; a second battery pack connector for connecting with the second tool connector after the first battery pack connector connecting with the first tool connector; and a resistor connected between the battery and the first battery pack connector, the resistor arranged so that the resistance between the first battery pack connector and the battery is greater than the resistance between the second battery pack connector and the battery, and thus limit the current flowing into or from the battery through the first battery pack connector. The first battery pack connector and the second battery pack connector are connected with one of the positive electrode or the negative electrode of the battery.

Further areas of applicability will become apparent from the description provided herein. It should be understood that the description and specific examples are intended for purposes of illustration only and are not intended to limit the scope of the present disclosure.

BRIEF DESCRIPTION OF THE DRAWING

The drawings described herein are for illustrative purposes only of various examples and not all possible implementations, and are not intended to limit the scope of the present disclosure. Corresponding reference numerals indicate corresponding parts throughout the several views of the drawings.

DETAILED DESCRIPTION

The following description of example methods and apparatus is not intended to limit the scope of the description to the precise form or forms detailed herein. Instead the following description is intended to be illustrative so that others may follow its teachings.

Figure 1:
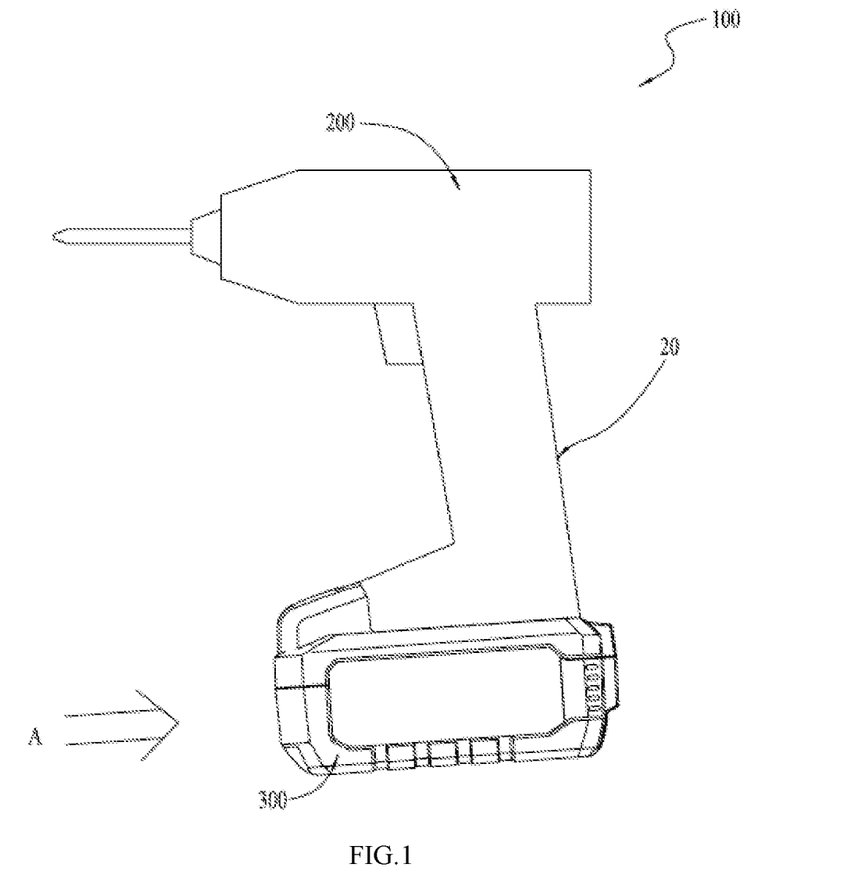
FIG. 1 is a schematic view of an exemplary electrical combination including a battery pack and a power tool.

As shown in FIG. 1, an electrical combination 100 includes a power tool 200 and a battery pack 300.

Figure 2:
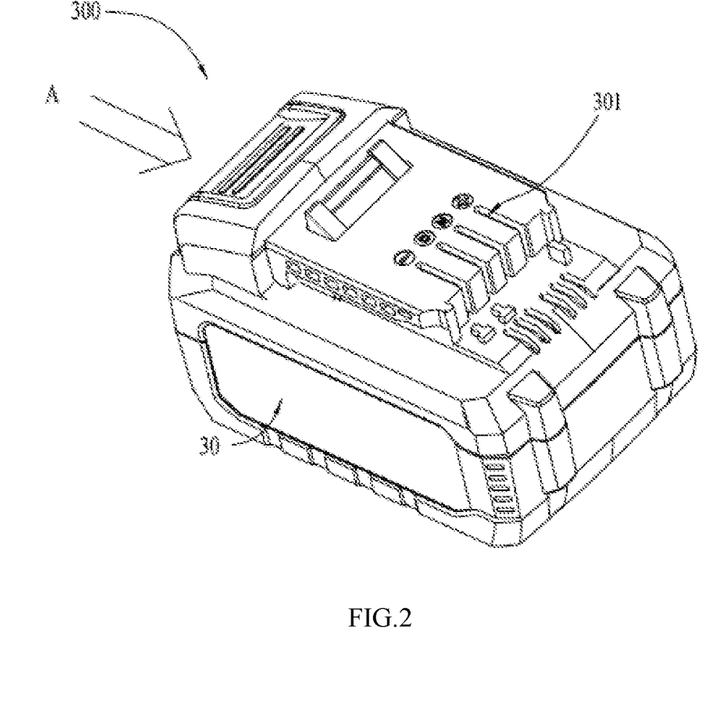
FIG. 2 is a schematic view of the battery pack of the electrical combination.
Figure 3:
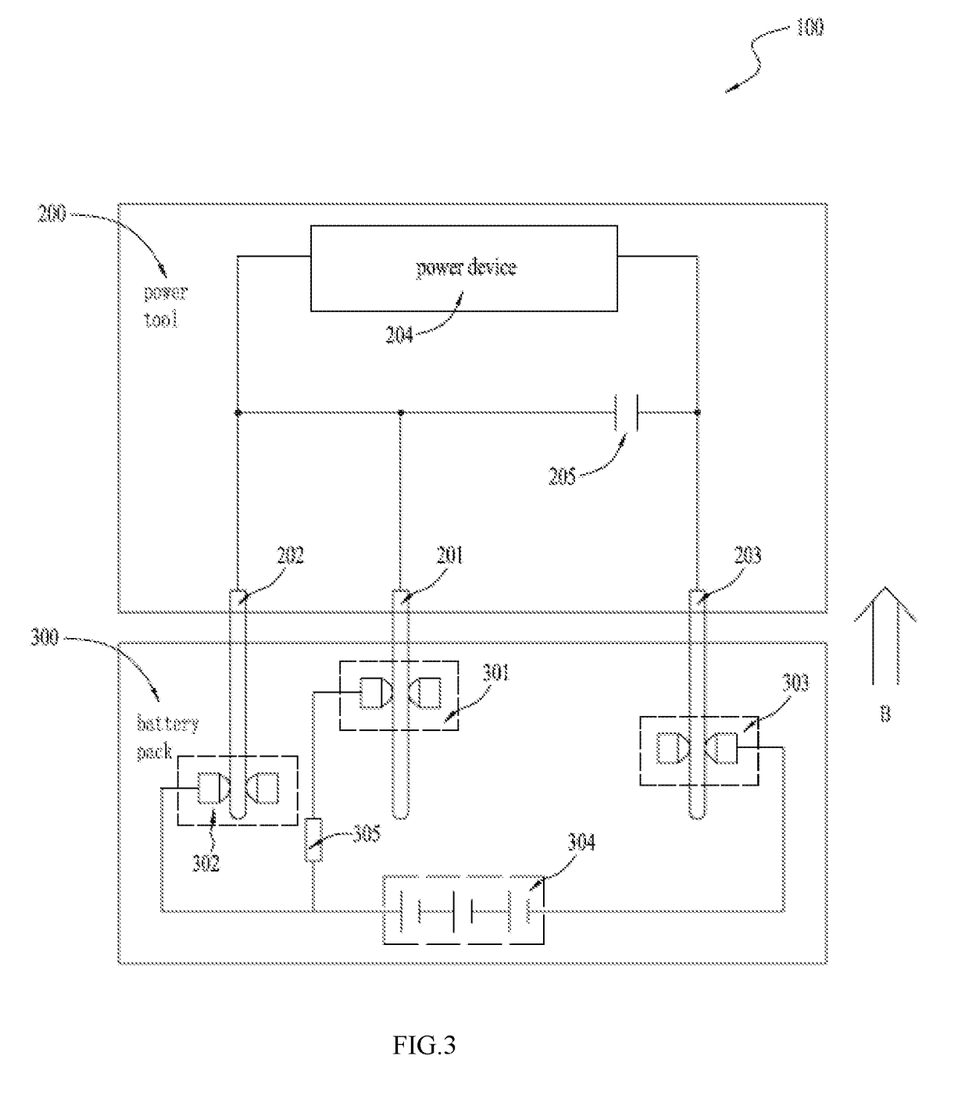
FIG. 3 is a block diagram of the electrical combination.

Referring to FIGS. 2-3, the power tool 200 includes a tool housing 20 and a power device 204. The power tool 200 further includes tool connectors 201, 202, 203 for connecting with the battery pack 300 so that the battery pack 300 can supply power to the power device 204 of the power tool 200. The power device 204 may be a motor, an indicating light or other device which uses electric energy to realize a power tool function. When the battery pack 300 is connected with the power tool 200, the tool connectors pass through terminal interfaces of the battery pack 300, extend in a housing 30 of the battery pack 300 and connect with the battery pack connectors in the housing 30 of the battery pack 300.

As shown in FIG. 2, the battery pack 300 includes the housing 30 and a battery accommodated in the housing 30. The housing 30 is provided with several terminal interfaces. One terminal interface 301 can correspond to one battery pack connector or several battery pack connectors.

The technique above is well known, and is not described in detail here.

As shown in FIG. 3, the power tool 200 includes the first tool connector 201, the second tool connector 202, the third tool connector 203, the power device 204 and a capacitor 205.

The first tool connector 201, the second tool connector 202 and the third tool connector 203 are at least partially exposed out of the power tool 200.

The second tool connector 202 and the third tool connector 203 are used to supply electric energy to the power device 204. In order to realize filter and adjust the voltage, the capacitor 205 is connected between the second tool connector 202 and the third tool connector 203. If the second tool connector 202 and the third tool connector 203 respectively contacts a positive electrode and a negative electrode of a power source simultaneously, a large current passes though the second tool connector 202 and the third tool connector 203 instantly, and electric spark may be generated so as to damage the tool connectors.

In order to solve the problem mentioned above, the first tool connector 201 is arranged to connect with the second tool connector 202, that is to say both the first tool connector 201 and the second tool connector 202 connect with the same terminal of the capacitor 205. For the capacitor 205, the first tool connector 201 and the second tool connector 202 act the same function.

The battery pack 300 includes a first battery pack connector 301, a second battery pack connector 302, a third battery pack connector 303 and a battery 304, which are arranged in the housing 30 of the battery pack 300. The battery pack 300 is provided with three terminal interfaces corresponding with the first battery pack connector 301, the second battery pack connector 302 and the third battery pack connector 303 respectively. The first, second and third battery pack connector 301, 302, 303 and the first, second and third tool connector 201, 202, 203 are made from conductive material, such as metal, which can transfer current through contacting.

The first tool connector 201, the second tool connector 202 and the third tool connector 203 are configured with a piece structure which facilitates to insert into the terminal interfaces of the battery pack 300. In order to contact steadily with the first, second and third tool connector 201, 202, 203, the first battery pack connector 301, the second battery pack connector 302 and the third battery pack connector 303 are configured with a clamping structure which is able to clamp the piece structure.

The first battery pack connector 301, the second battery pack connector 302 and the third battery pack connector 303 respectively include a first connection portion, a second connection portion and a third connection portion which are used to contact with the first tool connector 201, the second tool connector 202 and the third tool connector 203 inserted into the battery pack 300.

As shown in FIG. 3, a negative electrode of the battery 304 is connected with the third battery pack connector 303, a positive electrode of the battery 304 is connected with the first battery pack connector 301 and the second battery pack connector 302. A resistor 305 is arranged between the positive electrode of the battery 304 and the first battery pack connector 301, which can limit the current flowing through itself. The resistor 305 has a large resistance, so the resistance between the first battery pack connector 301 and the positive electrode of the battery 304 is greater than the resistance between the second battery pack connector 302 and the negative electrode of the battery 304.

The first, second and third tool connector 201, 202, 203 and the first, second and third battery pack connector 301, 302, 303 are so arranged that the first tool connector 201 contacts with the first battery pack connector 301 before the second tool connector 202 contacts with second battery pack connector 302 when the battery pack 300 is connected with the power tool 200 along the direction B. That is, firstly, the first tool connector 201 contacts and connects with the first battery pack connector 301, and then the second tool connector 202 contacts and connects with the second battery pack connector 302. For the connection of the third tool connector 203 and the third battery pack connector 303 and the connection of the first tool connector 201 and the first battery pack connector 301, there is no predetermined sequence. But the connection of the third tool connector 203 and the third battery pack connector 303 must be in advance of the connection of the second tool connector 202 and the second battery pack connector 302.

With this connection sequence, firstly, the capacitor 205 is connected with the negative and positive electrodes of the battery 304 through the connection of the third tool connector 203 and the third battery pack connector 303 and the connection of the first tool connector 201 and the first battery pack connector 301. The current in the circuit is limited because of the resistor 305. When the third tool connector 203 is connected with the third battery pack connector 303 and the second tool connector 202 is connected with the second battery pack connector 302, the electric spark cannot be generated. Then, the second tool connector 202 is contacted and connected with the second battery pack connector 302, although the large current passes through the circuit constructed by the connection of the second tool connector 202 and the second battery pack connector 302, the electrical potential is decreased because the capacitor 205 has been charged, so the possibility of generating electric spark is reduced. While, because the resistance of the circuit constructed by the connection of the second tool connector 202 and the second battery pack connector 302 is less than the resistance of the circuit constructed by the connection of the first tool connector 201 and the first battery pack connector 301, the circuit of the resistor 305 is opened. The power device 204 can get electric energy from the battery pack 300 through the second tool connector 202 and the third tool connector 203

As shown in FIG. 3, in order to realize the connection sequence, specifically, the first, second and third tool connector 201, 202, 203 has the same structure and aligns with each other in the connection direction B. Correspondently, the first, second and third battery pack connector 301, 302, 303 correspond with the first, second and third tool connector 201, 202, 203 respectively in a direction perpendicular to the connection direction B. In the connection direction B, the first, second and third battery pack connector 301, 302, 303 are staggered, and the second battery pack connector 302 is located at a further position relative to the tool connectors so as to realize the connection sequence. Otherwise, the positive electrode and the negative electrode of the battery 304 can be connected reversely to eliminate the electric spark.

Figure 5:
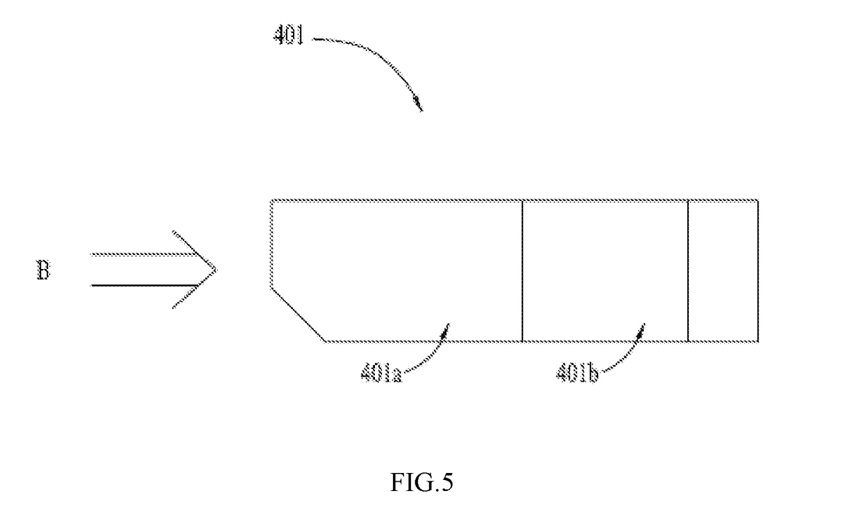
FIG. 5 is a schematic view of a tool connector.

As shown in FIG. 5, in another example, a first tool connector 401 includes a metal portion 401a and an insulation portion 401b. The metal portion 401a contacts with the first battery pack connector 301 firstly, and the insulation portion 401b contacts with the first battery pack connector 301 when the second tool connector 202 is connected with second battery pack connector 302. Thus, after the second tool connector 202 is connected with the second battery pack connector 302, the first tool connector 401 is electrically disconnected with the first battery pack connector 301.

In the examples above, the first tool connector 201 and the second tool connector 202 can be integrated as a whole, the two tool connectors are two portions of the whole, which have different locations and insulate with each other, and the two tool connectors are correspond with different terminal interface respectively. Or a whole including a pre-connection portion and a final connection portion which are insulated with each other can be used to act the function of the first tool connector 201 and the second tool connector 202.

As shown in FIG. 3, the third battery pack connector 303 is connected with one electrode of the battery 304, the first battery pack connector 301 and the second battery pack connector 302 are connected with another electrode of the battery 304; the first tool connector 201 is connected to one terminal of the capacitor 205 of the power tool 200, the second tool connector 202 is connected to one terminal of the capacitor 205 of the power tool 200, the third tool connector 203 is connected with another terminal of the capacitor 205.

A method for preventing the battery pack connector 302 and the tool connector 202 of the electrical combination 100 from generating electric spark is provided below.

The method may include a setting method for a manufacturer and a operating method for a user.

The setting method may include providing a first battery pack connector 301 which is connected to the second battery pack connector 302 and is configured to connect with the first tool connector 201 before the second tool connector 202 is connected to the second battery pack connector 302 and resistor 305 between the first battery pack connector 30 1 and the second battery pack connector 302.

The operating method may include connecting the first battery pack connector 301 of the battery pack 300 with the first tool connector 201 of the power tool 200 firstly; and connecting the second battery pack connector 302 of the battery pack 300 with the second tool connector 202 of the power tool 200 secondly.

The operating method may further include connecting the third battery pack connector 303 of the battery pack 300 with the third tool connector 202 of the power tool 200.

As shown as FIG. 3 and description above, it is helpful to avoid a large current shock and electric sparks between the battery pack and the power tool by using the methods described above.

Figure 6:
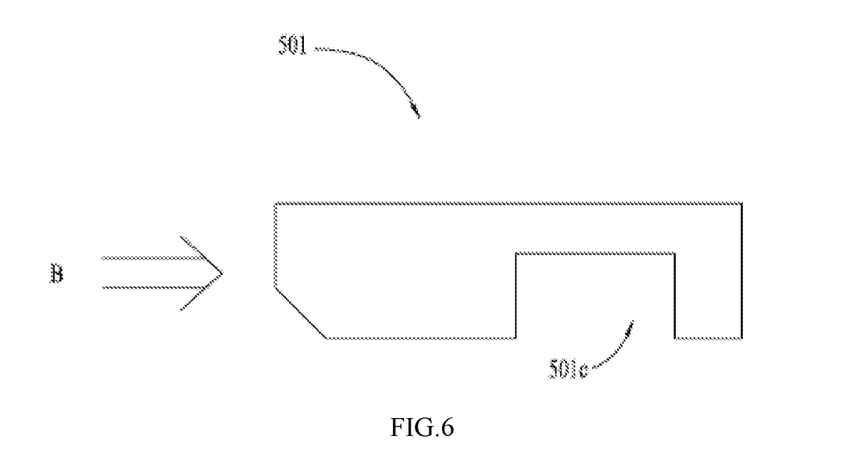
FIG. 6 is a schematic view of another example of the tool connector.

As shown in FIG. 6, further in another example, a first tool connector 501 is provided with a gap 501c. When the second tool connector 202 is connected with the second battery pack connector 302, the first battery pack connector 301 corresponds with the gap 501c so as to electrically disconnect them.

Figure 4:
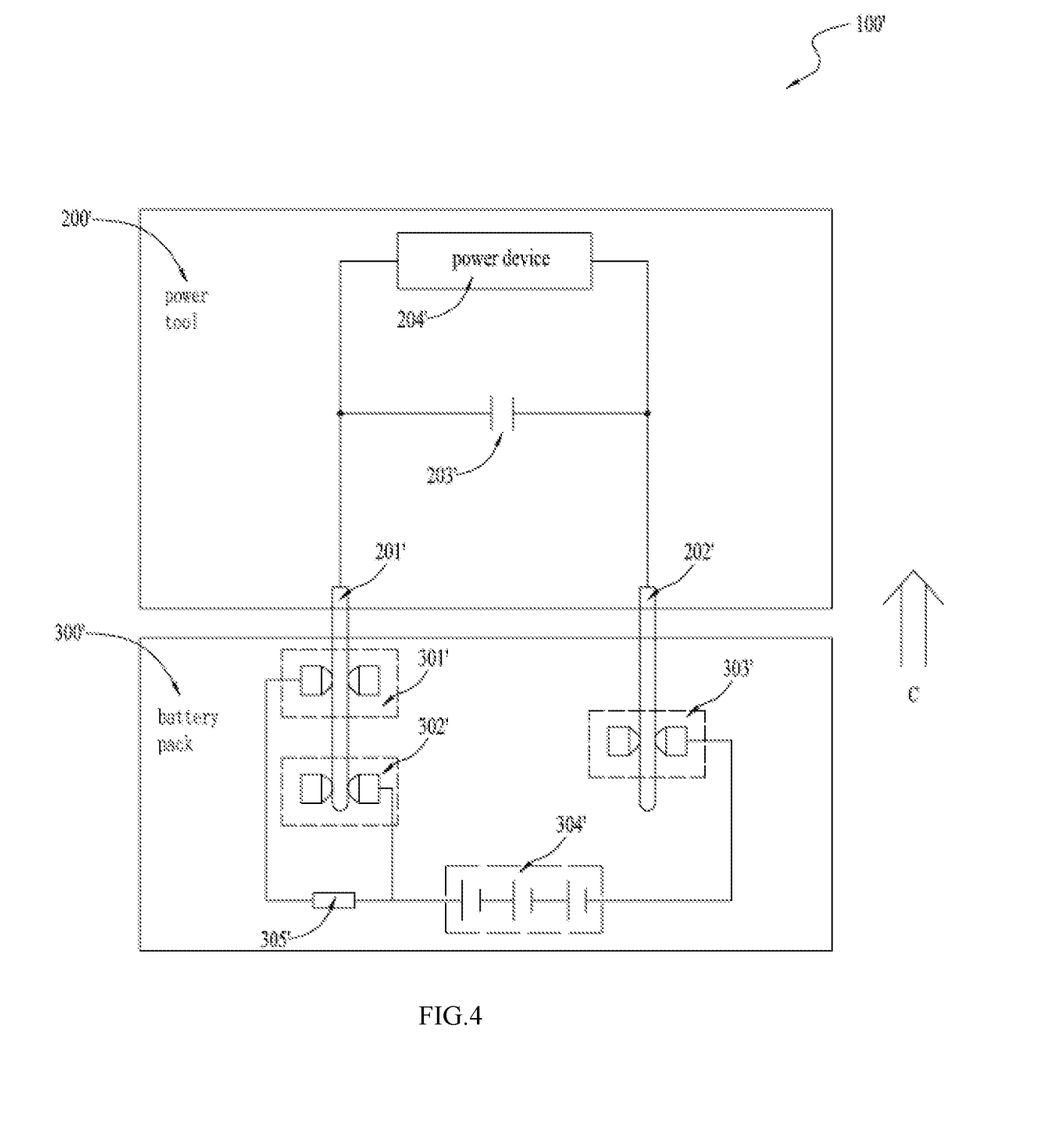
FIG. 4 is a block diagram of another example of the electrical combination.

As shown in FIG. 4, further in another example, an electrical combination 100' includes a power tool 200' and a battery pack 300'. The power tool 200' includes a first tool connector 201', a second tool connector 202', a capacitor 203' and a power device 204'. The capacitor 203' and the power device 204' are connected between the first tool connector 201' and the second tool connector 202'. This is the arrangement of currently known power tool. The currently known power tool only includes two tool connectors respectively connected with the positive electrode and the negative electrode of the battery. Specifically, the two tool connectors are tool connection terminals.

The battery pack 300' includes a first battery pack connector 301', a second battery pack connector 302', a third battery pack connector 303' and a battery 304'. The third battery pack connector 303' is connected with the negative electrode of the battery 304' (or the positive electrode). The first battery pack connector 301' and the second battery pack connector 302' are connected with the positive electrode of the battery 304' (or the negative electrode). A resistor 305' is arranged between the first battery pack connector 301' and the positive electrode of the battery 304'. The first battery pack connector 301' and the second battery pack connector 302' use the same terminal interface, which can connect with the tool connector inserted into the terminal interface.

The first battery pack connector 301' and the second battery pack connector 302' are so arranged that they contact with the first tool connector 201' successively when the battery pack 300' is connected with the power tool 200'.

As shown in FIG. 4, when the first tool connector 201' passes through the terminal interface and inserts into the battery pack 300', it contacts with the first connection portion of the first battery pack connector 301', the large current can't be generated because of the resistor 305'. With the first tool connector 201' further inserts, it contacts with the second connection portion of the second battery pack connector 302', and the connection circuit of the first battery pack connector 301' is short, so the battery 304' supplies electric energy to the power tool 200' at a normal discharging current.

The first tool connector 201' can be configured to have the structure as shown in FIGS. 5 and 6 so as to open the circuit of the first battery pack connector 301'.

Otherwise, the first battery pack connector 301' and the second battery pack connector 302' can be configured as a connection module for connecting with the tool connector, and the third battery pack connector 303' can be configured as another connection module. The two connection modules respectively correspond with different terminal interfaces and respectively connect with different tool connectors. It is noted that, the first battery pack connector 301' and the second battery pack connector 302' can be integrated as a whole, which have different locations in the connection direction B and insulate with each other. Or a whole including a pre-connection portion and a final connection portion which are insulated with each other can be used to realize the function of the first and the second battery pack connector 301', 302'.

As shown in FIG. 4, the third battery pack connector 303' is connected with one electrode of the battery 304', the first battery pack connector 301' and the second battery pack connector 302' are connected with another electrode of the battery 304'; the first tool connector 201' is connected to one terminal of the capacitor 203' of the power tool 200', the third tool connector 202' is connected with another terminal of the capacitor 203'.

A method for preventing the battery pack connector 302' and the tool connector 201' of the electrical combination 100' from generating electric spark is provided below.

The method may include a setting method for a manufacturer and a operating method for a user.

The setting method may include providing a first battery pack connector 301' which is connected to the second battery pack connector 302' and is configured to connect with the tool connector 201' before the tool connector 201' is connected to the second battery pack connector 302' and resistor 305' between the first battery pack connector 301' and second battery pack connector 302'.

The operating method may include connecting the first battery pack connector 301' of the battery pack 300' with the first tool connector 201' of the power tool 200' firstly; and connecting the second battery pack connector 302' of the battery pack 300' with the first tool connector 201' of the power tool 200' secondly.

The operating method may further include connecting the third battery pack connector 303' of the battery pack 300' with the third tool connector 202' of the power tool 200'.

As shown as FIG. 4 and description above, it's helpful to avoid a large current shock and electric sparks between the battery pack and the power tool by using the methods described above.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An electrical combination, comprising:
    a power tool comprising:
        a power device configured to use electric energy to realize a power tool function;
        a capacitor connected with the power device;
        a first tool connector connected with a terminal of the capacitor;
        a second tool connector connected with the terminal of the capacitor; and
        a third tool connector connected with another terminal of the capacitor; and
    a battery pack comprising:
        a battery comprising a positive electrode and a negative electrode;
        a first battery pack connector for connecting with the first tool connector;
        a second battery pack connector for connecting with the second tool connector after the first battery pack connector connecting with the first tool connector; and
        a resistor connected between the battery and the first battery pack connector, the resistor arranged so that a resistance between the first battery pack connector and the battery is greater than a resistance between the second battery pack connector and the battery, and thus limit a current flowing into or from the battery through the first battery pack connector,
    wherein the first battery pack connector and the second battery pack connector are connected with one of the positive electrode or the negative electrode of the battery.

2. The electrical combination of claim 1, wherein the battery pack comprising a third battery pack connector for connecting with the third tool connector, which is connected with the another one of negative electrode or the positive electrode of the battery.

3. The electrical combination of claim 1, wherein the battery pack comprises a third battery pack connector for connecting with the third tool connector, which is connected with another one of the negative electrode or the positive electrode of the battery.

4. The electrical combination of claim 1, wherein the power device includes a motor.

5. A battery pack configured to a power tool, comprising:
    a battery comprising a positive electrode and a negative electrode;
    a first battery pack connector for connecting with a first tool connector;
    a second battery pack connector for connecting with a second tool connector after the first battery pack connector connecting with the first tool connector; and
    a resistor connected between the battery and the first battery pack connector, the resistor arranged so that a resistance between the first battery pack connector and the battery is greater than a resistance between the second battery pack connector and the battery, and thus limit a current flowing into or from the battery through the first battery pack connector,
    wherein the first battery pack connector and the second battery pack connector are connected with one of the positive electrode or the negative electrode of the battery.

6. The battery pack of claim 5, wherein the battery pack comprising a third battery pack connector for connecting with a third tool connector, which is connected with the another one of negative electrode or the positive electrode of the battery.

* * * * *